US012576611B2

(12) United States Patent
Jin et al.

(10) Patent No.: US 12,576,611 B2
(45) Date of Patent: Mar. 17, 2026

(54) NONWOVEN FABRICS SUITABLE FOR MEDICAL APPLICATIONS

(71) Applicant: Nanhai Nanxin Non-Woven Co. Ltd., Foshan (CN)

(72) Inventors: Yongji Jin, Shanghai (CN); Guohua Wu, Jiujiang (CN)

(73) Assignee: Nanhai Nanxin Non-Woven Co. Ltd., Foshan City (CN)

( * ) Notice: Subject to any disclaimer, the term of this patent is extended or adjusted under 35 U.S.C. 154(b) by 813 days.

(21) Appl. No.: 17/829,728

(22) Filed: Jun. 1, 2022

(65) Prior Publication Data

US 2022/0388271 A1    Dec. 8, 2022

Related U.S. Application Data

(60) Provisional application No. 63/197,063, filed on Jun. 4, 2021.

(51) Int. Cl.
| | |
|---|---|
| *B32B 5/02* | (2006.01) |
| *B32B 5/26* | (2006.01) |
| *D04H 1/559* | (2012.01) |
| *D04H 3/14* | (2012.01) |

(52) U.S. Cl.
CPC ................ *B32B 5/022* (2013.01); *B32B 5/26* (2013.01); *D04H 1/559* (2013.01); *D04H 3/14* (2013.01); *B32B 2262/0253* (2013.01); *B32B 2262/124* (2021.05); *B32B 2535/00* (2013.01)

(58) Field of Classification Search
CPC ........... B32B 5/022; B32B 5/26; B32B 5/267; B32B 2262/124
See application file for complete search history.

(56) References Cited

U.S. PATENT DOCUMENTS

| | | | |
|---|---|---|---|
| 5,342,338 | A | 8/1994 | Roe |
| 5,509,915 | A | 4/1996 | Hanson et al. |
| 5,951,535 | A | 9/1999 | Fujiwara et al. |
| 6,443,931 | B1 | 9/2002 | Kurata et al. |

(Continued)

FOREIGN PATENT DOCUMENTS

| | | |
|---|---|---|
| CN | 106460241 A | 2/2017 |
| DE | 69714832 T2 | 5/2003 |

(Continued)

OTHER PUBLICATIONS

Brochure from Non-woven.com (Year: 2015).*

(Continued)

*Primary Examiner* — Hoa (Holly) Le

(74) *Attorney, Agent, or Firm* — BURR & FORMAN

(57) ABSTRACT

Nonwoven fabrics including a first spunbond layer comprising a first plurality of crimped continuous fibers, a second spunbond layer comprising a second plurality of crimped continuous fibers, and a third spunbond layer comprising a third plurality of crimped continuous fibers, in which the second spunbond layer is located directly or indirectly between the first spunbond layer and the third spunbond layer is provided. The nonwoven fabrics may have a thickness (e.g., loftiness) of at least about 0.3 mm and hydrostatic head of at least about 15 mbar. Methods of manufacturing nonwoven fabrics and protective articles are also provided.

22 Claims, 4 Drawing Sheets

(56) References Cited

U.S. PATENT DOCUMENTS

Figure 1:
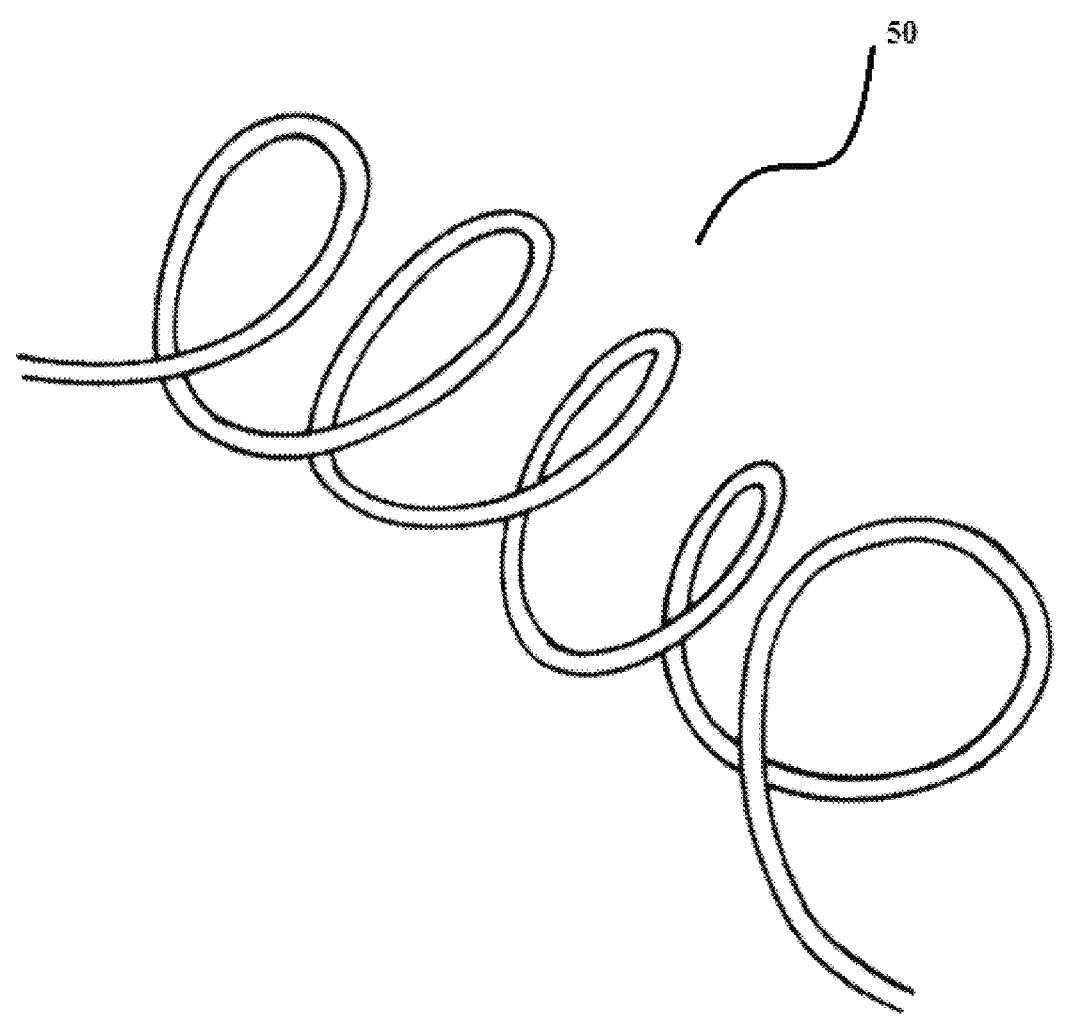

| | | | |
|---|---|---|---|
| 8,426,671 B2 | 4/2013 | Steffen et al. | |
| 2004/0019340 A1 | 1/2004 | McBride | |
| 2010/0280479 A1 | 11/2010 | Svensson et al. | |
| 2014/0171894 A1 | 6/2014 | Detani et al. | |
| 2016/0206393 A1 | 7/2016 | Wang et al. | |
| 2018/0291543 A1 | 10/2018 | Ramaratnam et al. | |
| 2019/0021913 A1 | 1/2019 | Wang et al. | |
| 2019/0233993 A1* | 8/2019 | Sommer | D01F 1/10 |
| 2019/0233994 A1* | 8/2019 | Sommer | D04H 1/43918 |
| 2023/0094829 A1* | 3/2023 | Kim | B32B 5/08 |
| | | | 2/69 |

FOREIGN PATENT DOCUMENTS

| | | | |
|---|---|---|---|
| EP | 2952166 A1 | 12/2015 | |
| EP | 3209260 A1 | 8/2017 | |
| EP | 3521496 A1 | 8/2019 | |
| EP | 4036297 A1 | 8/2022 | |
| JP | 2003175074 A | 6/2003 | |
| JP | 2004008325 A | 1/2004 | |
| WO | 0028123 A1 | 5/2000 | |
| WO | 02057525 A2 | 7/2002 | |

OTHER PUBLICATIONS

International Search Report and Written Opinion of corresponding international application No. PCT/CN2022/096902 issued on Sep. 23, 2022, all enclosed pages cited herein.

Search Report and Written Opinion from Corresponding European Application No. 25181070.1, mailed Jul. 14, 2025, all pages cited in its entirety.

Office Action issued in corresponding European Patent Application No. 22740762.4 mailed Sep. 20, 2024, all pages cited in its entirety.

Intention to Grant issued in corresponding European Patent Application No. 22740762.4 mailed Jan. 29, 2025, all pages cited in its entirety.

International Preliminary Report on Patentability of corresponding international application No. PCT/CN2022/096902 issued on Jun. 7, 2023, all enclosed pages cited herein.

* cited by examiner

50

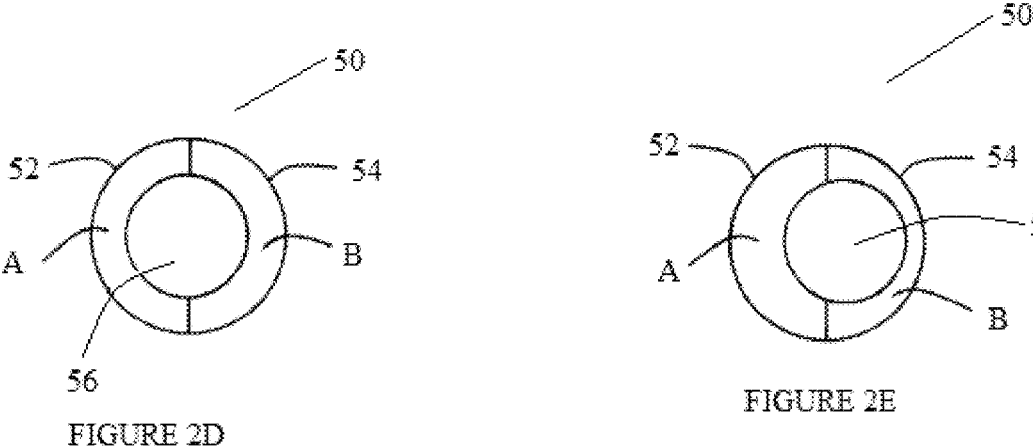
FIGURE 2D
FIGURE 2E
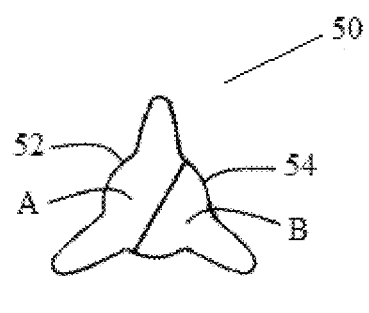
FIGURE 2F
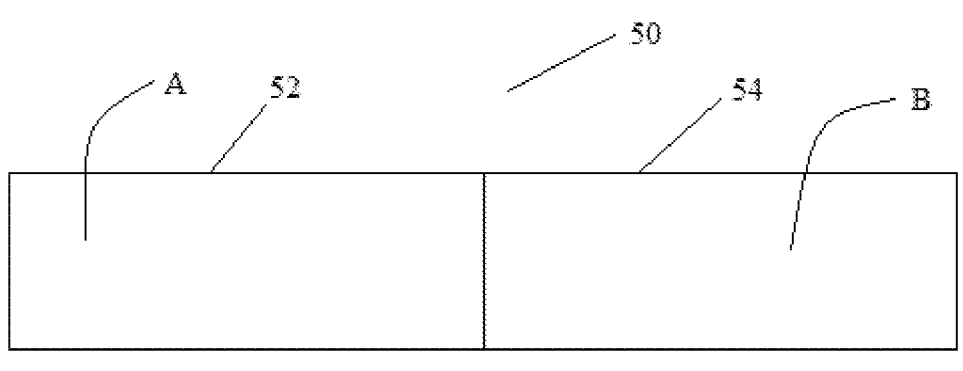
FIGURE 2G

NONWOVEN FABRICS SUITABLE FOR MEDICAL APPLICATIONS

CROSS-REFERENCE TO RELATED APPLICATIONS

This application claims priority under 35 U.S.C. § 119 to U.S. Patent Application No. 63/197,063 filed Jun. 4, 2021, which is expressly incorporated by reference herein in its entirety.

TECHNICAL FIELD

The presently-disclosed invention relates generally to nonwoven fabrics that provide desirable barrier properties suitable for a variety of medical applications, while also providing a level of bulkiness and/or softness desired from a user. The presently-disclosed invention also provides methods of manufacturing such nonwoven fabrics, as well as protective articles (e.g., garments) including such non-woven fabrics.

BACKGROUND

Clean air suits are typically used to minimize the spread of infective agents to patients, surgical sites, and equipment by, for example, prevention of dispersal of bacterial-carrying scales from the operating room staff. As such, clean air suits help prevent post-operative surgical-site infections. Overall, clean air suits have been demonstrated to contribute to reduction of infection risks.

Most clean air suits utilize at least one layer of meltblown fibers, such as a spunbond-meltblown-spunbond (SMS) structure as they provide adequate barrier properties and tensile strength per BS EN13795:2019 Part 2. These structures, however, have not been well received in the market due to their plastic feeling.

Reusable cotton fabric has also been used to produce clean air suits due to comfortability (cottony feeling). These materials, however, typically fail to meet required barrier properties, such as Microbial penetration—Dry per EN ISO 22612, which is defined as a key attribute in EN13795:2019 Part 2.

Therefore, there remains a need for a nonwoven fabric that provides a soft and/or cottony feel while also providing sufficient barrier properties for use in a variety of medical applications, such as for clean air suits.

SUMMARY OF INVENTION

One or more embodiments of the invention may address one or more of the aforementioned problems. Certain embodiments according to the invention provide a nonwoven fabric comprising a plurality of spunbond layers. The nonwoven fabric, in accordance with certain embodiments of the invention, include a first spunbond layer comprising a first plurality of crimped continuous fibers, a second spunbond layer comprising a second plurality of crimped continuous fibers, and a third spunbond layer comprising a third plurality of crimped continuous fibers, in which the second spunbond layer is located directly or indirectly between the first spunbond layer and the third spunbond layer. The nonwoven fabric, in accordance with certain embodiments of the invention has a thickness (e.g., bulkiness) of at least about 0.3 mm (pressure at 0.2 kPa) and hydrostatic head of at least about 15 mbar per EN ISO 811.

In another aspect, the invention provides a method of forming a nonwoven fabric, such as those described and disclosed herein. The method may comprise providing or forming a first spunbond layer comprising a first plurality of crimped continuous fibers, providing or forming a second spunbond layer comprising a second plurality of crimped continuous fibers, and providing or forming a third spunbond layer comprising a third plurality of crimped continuous fibers. The method may also comprise locating the second spunbond layer directly or indirectly between the first spunbond layer and the third spunbond layer. The method may also comprise a step or steps of bonding the first spunbond layer, the second spunbond layer, and the third spunbond layer together to form the nonwoven fabric, wherein the nonwoven fabric has a thickness of at least about 0.3 mm and hydrostatic head of at least about 15 mbar.

In yet another aspect, the invention provides a protective article including a nonwoven fabric as described and disclosed herein, in which the entirety of the protective article or at least a portion thereof is formed from the nonwoven fabric. For instance, the protective article comprises a drape, a garment (e.g., clean air suit), or a portion of a garment (e.g., clean air suit). In accordance with certain embodiments of the invention the nonwoven fabric and/or the protective article (e.g., a clean air suit) may have a microbial penetration—Dry of less than 100 CFU, such as less than 50 CFU or less than 20 CFU, as determined by EN ISO 22612 using a challenge concentration of $10^8$ CFU/gram of talcum and 30 minute vibration time.

BRIEF DESCRIPTION OF THE DRAWING(S)

The invention now will be described more fully herein-after with reference to the accompanying drawings, in which some, but not all embodiments of the invention are shown. Indeed, this invention may be embodied in many different forms and should not be construed as limited to the embodiments set forth herein; rather, these embodiments are provided so that this disclosure will satisfy applicable legal requirements. Like numbers refer to like elements throughout, and wherein:

FIG. 1 illustrates a continuous crimped fiber (e.g., continuous fiber including a plurality of crimped portions) in accordance with certain embodiments of the invention; and FIG. 2A-2H illustrate examples of cross-sectional views for some example multi-component fibers in accordance with certain embodiments of the invention.

DETAILED DESCRIPTION

The invention now will be described more fully herein-after with reference to the accompanying drawings, in which some, but not all embodiments of the invention are shown. Indeed, this invention may be embodied in many different forms and should not be construed as limited to the embodiments set forth herein; rather, these embodiments are provided so that this disclosure will satisfy applicable legal requirements. As used in the specification, and in the appended claims, the singular forms "a", "an", "the", include plural referents unless the context clearly dictates otherwise.

The invention provides, according to certain embodiments, nonwoven fabrics including a plurality of spunbond layers each including a plurality of crimped continuous fibers (e.g., continuous spunbond fibers having a plurality of crimped portions). The nonwoven fabrics, in accordance with certain embodiments of the invention, may provide a soft and/or cottony feel while also providing sufficient barrier properties for use in a variety of medical applications, such as for clean air suits. For example, nonwoven fabrics may include a thickness (e.g., loftiness and/or bulkiness) at 0.2 kPa of at least 0.3 mm, while conventional spunmelt materials cannot achieve this level of thickness per basis weight and/or per number of layers. Additionally, nonwoven fabrics in accordance with certain embodiments of the invention may provide an improved hydrostatic head that may be greater than 15 mbar, which is not generally achievable from conventional spunbond materials (e.g., at the same basis weight). Nonwoven fabrics, in accordance with certain embodiments of the invention, may have a microbial penetration—Dry (EN ISO 22612) of less than about 20 CFU (e.g., less than 100 CFU per EN13795:2019 Part 2). In accordance with certain embodiments of the invention, the combination of the plurality of crimped spunbond fibers and their fine deniers create a special spunbond material (e.g., a nonwoven fabric with outstanding bulkiness and barrier properties) that may be particularly desirable for use in clean air suit applications. For example, the nonwoven fabric in accordance with certain embodiments of the invention meets BS EN 13795-2 2019—Requirements for Surgical Clothing & Drapes—clean air suits. To pass this standard, nonwoven fabrics typically require at least one meltblown layer (e.g., a SMS structure). In accordance with certain embodiments of the invention, the nonwoven fabric may be devoid of meltblown fibers and/or sub-micron fibers.

The terms "substantial" or "substantially" may encompass the whole amount as specified, according to certain embodiments of the invention, or largely but not the whole amount specified (e.g., 95%, 96%, 97%, 98%, or 99% of the whole amount specified) according to other embodiments of the invention.

The terms "polymer" or "polymeric", as used interchangeably herein, may comprise homopolymers, copolymers, such as, for example, block, graft, random, and alternating copolymers, terpolymers, etc., and blends and modifications thereof. Furthermore, unless otherwise specifically limited, the term "polymer" or "polymeric" shall include all possible structural isomers; stereoisomers including, without limitation, geometric isomers, optical isomers or enantiomers; and/or any chiral molecular configuration of such polymer or polymeric material. These configurations include, but are not limited to, isotactic, syndiotactic, and atactic configurations of such polymer or polymeric material. The term "polymer" or "polymeric" shall also include polymers made from various catalyst systems including, without limitation, the Ziegler-Natta catalyst system and the metallocene/single-site catalyst system. The term "polymer" or "polymeric" shall also include, in according to certain embodiments of the invention, polymers produced by fermentation process or biosourced.

The terms "nonwoven" and "nonwoven web", as used herein, may comprise a web having a structure of individual fibers, filaments, and/or threads that are interlaid but not in an identifiable repeating manner as in a knitted or woven fabric. Nonwoven webs, according to certain embodiments of the invention, may be formed by any process conventionally known in the art such as, for example, meltblowing processes, spunbonding processes, needle-punching, hydroentangling, air-laid, and bonded carded web processes. A "nonwoven web", as used herein, may comprise a plurality of individual fibers that have not been subjected to a consolidating process.

The term "nonwoven fabric", as used herein, may comprise a web of fibers in which a plurality of the fibers are mechanically entangled or interconnected, fused together, and/or chemically bonded together. For example, a nonwoven web of individually laid fibers may be subjected to a bonding or consolidation process to mechanically entangle, thermally bond, or otherwise bond, at least a portion of the individually fibers together to form a coherent (e.g., united) web of interconnected fibers.

The term "consolidated" and "consolidation", as used herein, may comprise the bringing together of at least a portion of the fibers of a nonwoven web or of a plurality of nonwoven webs into closer proximity or attachment therebetween (e.g., thermally fused together, chemically bonded together, and/or mechanically entangled together) to form a bonding site, or bonding sites, which function to increase the resistance to external forces (e.g., abrasion and tensile forces), as compared to the unconsolidated web. The bonding site or bonding sites, for example, may comprise a discrete or localized region of the web material that has been softened or melted and optionally subsequently or simultaneously compressed to form a discrete or localized deformation in the web material. Furthermore, the term "consolidated" may comprise an entire nonwoven web that has been processed such that at least a portion of the fibers are brought into closer proximity or attachment there-between (e.g., thermally fused together, chemically bonded together, and/or mechanically entangled together), such as by thermal bonding or mechanical entanglement (e.g., hydroentanglement) as merely a few examples. Such a web may be considered a "consolidated nonwoven", "nonwoven fabric" or simply as a "fabric" according to certain embodiments of the invention.

In accordance with certain embodiments of the invention, consolidation may be achieved by methods that apply, for example, heat and/or pressure to the fibrous web (e.g., nonwoven web) via one or more embossing rolls or using a stream of hot fluid (e.g., through-air bonding). One non-limiting and exemplary method comprises thermal bonding. Thermal bonding can be accomplished by passing the fibrous web (e.g., nonwoven web) through a pressure nip formed by two rolls, one of which comprising an embossing roll which may be heated and contain a plurality of raised protrusions having one or more geometric shapes (e.g., points, diamond shaped, circular, elliptical, dog-bone shaped, etc.) on its surface which impart or form corresponding discrete thermal bond sites on the fibrous web (e.g., nonwoven web). Such an operating step, for example, may be referred to as "calendering" or "embossing" in which the nonwoven web is drawn between an embossing roll having an embossing pattern allowing only part of the web to become exposed to heat and pressure and a second roll (e.g., an anvil roll). The degree or extent of consolidation may be expressed as a percentage of the total surface area of the web that has been consolidated or subjected to consolidation and may be referred to as a "bonding area" or "consolidation area". Stated somewhat differently, the terms "bonding area" and "consolidated area", as used interchangeably herein, may comprise the area per unit area occupied by the localized sites formed by bonding the fibers into bond sites and may be expressed as a percentage of the total unit area of the consolidated nonwoven. For example, consolidated nonwovens (e.g., subjected to thermal bonding via an embossing roll) may comprise a plurality of discrete, spaced-apart bond sites or points (e.g., perimeter and internal bond sites or points) formed by bonding only the fibers of the nonwoven web in the area of localized energy input. Fibers or portions of fibers remote from the localized energy input remain substantially unbonded to adjacent fibers.

The term "continuous fiber", as used herein, may comprise a filament that has a high length-to-diameter aspect ratio (i.e., length:diameter) such as, for example, exceeding about 500,000:1, exceeding about 750,000:1, or exceeding about 1,000,000:1. In accordance with certain embodiments of the invention, the term "continuous fiber" may comprise a filament that is essentially endless in length.

The term "spunbond", as used herein, may comprise fibers which are formed by extruding molten thermoplastic material as filaments from a plurality of fine, usually circular, capillaries of a spinneret with the diameter of the extruded filaments then being rapidly reduced. According to an embodiment of the invention, spunbond fibers are generally not tacky when they are deposited onto a collecting surface and may be generally continuous. It is noted that the spunbond used in certain composites of the invention may include a nonwoven described in the literature as SPIN-LACE®.

The term "meltblown", as used herein, may comprise fibers formed by extruding a molten thermoplastic material through a plurality of fine die capillaries as molten threads or filaments into converging high velocity, usually hot, gas (e.g. air) streams which attenuate the filaments of molten thermoplastic material to reduce their diameter, which may be to microfiber diameter, according to certain embodiments of the invention. According to an embodiment of the invention, the die capillaries may be circular. Thereafter, the meltblown fibers are carried by the high velocity gas stream and are deposited on a collecting surface to form a web of randomly disbursed meltblown fibers. Meltblown fibers are microfibers which may be continuous or discontinuous and are generally tacky when deposited onto a collecting surface.

The term "staple fiber", as used herein, may comprise a cut fiber from a filament. In accordance with certain embodiments, any type of filament material may be used to form staple fibers. For example, staple fibers may be formed from polymeric fibers, and/or elastomeric fibers. Non-limiting examples of materials may comprise polyolefins (e.g., a polypropylene or polypropylene-containing copolymer), polyethylene terephthalate, and polyamides. The average length of staple fibers may comprise, by way of example only, from about 2 centimeter to about 15 centimeter. Staple fibers may be either monocomponent fibers or multicomponent fibers.

The term "layer", as used herein, may comprise a generally recognizable combination of similar material types and/or functions existing in the X-Y plane.

The term "multi-component fibers", as used herein, may comprise fibers formed from at least two different polymeric materials or compositions (e.g., two or more) extruded from separate extruders but spun together to form one fiber. The term "bi-component fibers", as used herein, may comprise fibers formed from two different polymeric materials or compositions extruded from separate extruders but spun together to form one fiber. The polymeric materials or polymers are arranged in a substantially constant position in distinct zones across the cross-section of the multi-component fibers and extend continuously along the length of the multi-component fibers. The configuration of such a multi-component fibers may be, for example, a sheath/core arrangement wherein one polymer is surrounded by another, an eccentric sheath/core arrangement, a side-by-side arrangement, a pie arrangement, or an "islands-in-the-sea" arrangement, each as is known in the art of multicomponent, including bicomponent, fibers.

The term "machine direction" or "MD", as used herein, comprises the direction in which the fabric produced or conveyed. The term "cross-direction" or "CD", as used herein, comprises the direction of the fabric substantially perpendicular to the MD.

The term "crimp" or "crimped", as used herein, comprises a three-dimensional curl or bend such as, for example, a folded or compressed portion having an "L" configuration, a wave portion having a "zig-zag" configuration, or a curl portion such as a helical configuration. In accordance with certain embodiments of the invention, the term "crimp" or "crimped" does not include random two-dimensional waves or undulations in a fiber, such as those associated with normal lay-down of fibers in a melt-spinning process.

The term "high-loft", as used herein, comprises a material that comprises a z-direction thickness generally in excess of about 0.3 mm and a relatively low bulk density. The thickness of a "high-loft" nonwoven fabric and/or layer may be greater than 0.3 mm (e.g., greater than 0.4 mm, greater than 0.5 mm, greater than 0.6 mm, or greater than 0.7 mm) as determined utilizing a ProGage Thickness tester (model 89-2009) available from Thwig-Albert Instrument Co. (West Berlin, New Jersey 08091), which utilizes a 2" diameter foot, having a force application of 1.45 kPa during measurement. "High-loft" nonwoven fabrics and/or layers, as used herein, may additionally have a relatively low density (e.g., bulk density—weight per unit volume), such as less than about 60 kg/m$^3$, such as at most about any of the following: 70, 60, 55, 50, 45, 40, 35, 30, and 25 kg/m$^3$ and/or at least about any of the following: 10, 15, 20, 25, 30, 35, 40, 45, 50, and 55 kg/m$^3$.

The term "colony forming unit" (CFU), as used herein refers to a unit by which the culturable number of microorganisms is expressed, in which the culturable number is the number of microorganisms, single cells or aggregates, able to form colonies on a solid nutrient medium.

The term "clean air suit" as used herein, is a wearable garment, such as a working garment in medical applications, that is intended and shown to minimize contamination of the operating room air from skin scales originating on the skin of persons wearing it. For example, a clean air suit may comprise or consist of a coverall, or a blouse, or and a pair of trousers.

As used herein, the term "scrub suit" is a working garment for operating room staff that does not need to meet the requirements for a clean air suit. The scrub suit is not primarily intended to prevent airborne dispersal from staff, and can be designed and processed as the manufacturer thinks fit.

As used herein, the term "resistance to microbial penetration" refers to the ability of material(s) to withstand penetration of micro-organisms from one side of the material (e.g., nonwoven fabric) through to the other side.

As used herein, the term "dry penetration" refers to the effect of a combination of air movement and mechanical action by vibration on microbial penetration in a dry condition.

Whenever a melt flow rate (MFR) is referenced herein, the value of the MFR is determined in accordance with standard procedure ASTM D1238 (2.16 kg at 230° C.).

All whole number end points disclosed herein that can create a smaller range within a given range disclosed herein are within the scope of certain embodiments of the invention. By way of example, a disclosure of from about 10 to about 15 includes the disclosure of intermediate ranges, for example, of: from about 10 to about 11; from about 10 to about 12; from about 13 to about 15; from about 14 to about 15; etc. Moreover, all single decimal (e.g., numbers reported to the nearest tenth) end points that can create a smaller range within a given range disclosed herein are within the scope of certain embodiments of the invention. By way of example, a disclosure of from about 1.5 to about 2.0 includes the disclosure of intermediate ranges, for example, of: from about 1.5 to about 1.6; from about 1.5 to about 1.7; from about 1.7 to about 1.8; etc.

Certain embodiments according to the invention provide a nonwoven fabric comprising a plurality of spunbond layers. The nonwoven fabric, in accordance with certain embodiments of the invention, include a first spunbond layer comprising a first plurality of crimped continuous fibers, a second spunbond layer comprising a second plurality of crimped continuous fibers, and a third spunbond layer comprising a third plurality of crimped continuous fibers, in which the second spunbond layer is located directly or indirectly between the first spunbond layer and the third spunbond layer. The nonwoven fabric, in accordance with certain embodiments of the invention has a thickness (e.g., loftiness) of at least about 0.3 mm and hydrostatic head of at least about 15 mbar. FIG. 1, for instance, illustrates a continuous crimped fiber 50 (e.g., continuous spunbond fiber including a plurality of crimped portions) in accordance with certain embodiments of the invention, in which the continuous crimped fiber 50 includes plurality of three-dimensional coiled or helically shaped crimped portions.

In accordance with certain embodiments of the invention, the first spunbond layer may comprise a basis weight from about 10 to about 30 grams-per-meter squared (gsm), such as at least about any of the following: 10, 12, 15, 18, and 20 gsm, and/or at most about any of the following: 30, 28, 25, 22, 20, 18, and 15 gsm. Additionally or alternatively, the second spunbond layer may have a basis weight from about 10 to about 30 grams-per-meter squared (gsm), such as at least about any of the following: 10, 12, 15, 18, and 20 gsm, and/or at most about any of the following: 30, 28, 25, 22, 20, 18, and 15 gsm. Additionally or alternatively, the third spunbond layer may have a basis weight from about 10 to about 30 grams-per-meter squared (gsm), such as at least about any of the following: 10, 12, 15, 18, and 20 gsm, and/or at most about any of the following: 30, 28, 25, 22, 20, 18, and 15 gsm.

In accordance with certain embodiments of the invention, the nonwoven fabric may comprise a basis weight from about 40 to about 100 grams-per-meter squared (gsm), such as at least about any of the following: 40, 45, 50, 60 and 70 gsm, and/or at most about any of the following: 100, 90, 80, 70, and 60 gsm.

In accordance with certain embodiments of the invention, the first plurality of crimped continuous fibers may have an average diameter from about 8 to about 30 microns, such as at least about any of the following: 8, 10, 12, 14, 15, 16, 18, and 20 microns, and/or at most about any of the following: 30, 28, 26, 25, 24, 23, 22, 21, and 20 microns (e.g., from 12-20 microns). Additionally or alternatively, the second plurality of crimped continuous fibers may have an average diameter from about 8 to about 30 microns, such as at least about any of the following: 8, 10, 12, 14, 15, 16, 18, and 20 microns, and/or at most about any of the following: 30, 28, 26, 25, 24, 23, 22, 21, and 20 microns (e.g., from 12-20 microns). Additionally or alternatively, the third plurality of crimped continuous fibers may have an average diameter from about 8 to about 30 microns, such as at least about any of the following: 8, 10, 12, 14, 15, 16, 18, and 20 microns, and/or at most about any of the following: 30, 28, 26, 25, 24, 23, 22, 21, and 20 microns (e.g., from 12-20 microns).

In accordance with certain embodiments of the invention, the first plurality of crimped continuous fibers may have an average denier from about 0.6 to about 3, such as at least about any of the following: 0.6, 0.8, 1, 1.2, 1.4, 1.5, 1.6, 1.8, and 2, and/or at most about any of the following: 3, 2.8, 2.6, 2.5, 2.4, 2.2, and 2 (e.g., from 1-2 denier). Additionally or alternatively, the second plurality of crimped continuous fibers may have an average denier from about 0.6 to about 3, such as at least about any of the following: 0.6, 0.8, 1, 1.2, 1.4, 1.5, 1.6, 1.8, and 2, and/or at most about any of the following: 3, 2.8, 2.6, 2.5, 2.4, 2.2, and 2 (e.g., from 1-2 denier). Additionally or alternatively, the third plurality of crimped continuous fibers may have an average denier from about 0.6 to about 3, such as at least about any of the following: 0.6, 0.8, 1, 1.2, 1.4, 1.5, 1.6, 1.8, and 2, and/or at most about any of the following: 3, 2.8, 2.6, 2.5, 2.4, 2.2, and 2 (e.g., from 1-2 denier).

In accordance with certain embodiments of the invention, the first plurality of crimped continuous fibers may comprise a first plurality monocomponent fibers or a combination of a first plurality of monocomponent fibers and a first plurality of multicomponent fibers. Additionally or alternatively, the second plurality of crimped continuous fibers may comprise a second plurality of monocomponent fibers or a combination of a second plurality of monocomponent fibers and a second plurality of multicomponent fibers. Additionally or alternatively, the third plurality of crimped continuous fibers may comprise a third plurality of monocomponent fibers or a combination of a third plurality of monocomponent fibers and a third plurality of multicomponent fibers. In accordance with certain embodiments of the invention, the first plurality of crimped continuous fibers, the second plurality of continuous fibers, and the third plurality of crimped continuous fibers may independently from each other comprise from about 0 to about 100% by number of monocomponent fibers, such as at least about any of the following: 0, 10, 20, 30, 40 and 50% by number of monocomponent fibers, and/or at most about any of the following: 100, 90, 80, 70, 60, and 50% by number of monocomponent fibers. Additionally or alternatively, the first plurality of crimped continuous fibers, the second plurality of continuous fibers, and the third plurality of crimped continuous fibers may independently from each other comprise from about 0 to about 100% by number of multicomponent fibers, such as at least about any of the following: 0, 10, 20, 30, 40 and 50% by number of multicomponent fibers, and/or at most about any of the following: 100, 90, 80, 70, 60, and 50% by number of multicomponent fibers.

In accordance with certain embodiments of the invention, the first plurality of monocomponent fibers, the second plurality of monocomponent fibers, and the third component fibers independently from each other comprise a polymeric material comprising a synthetic polymer, such as a polyolefin, a polyester, a polyamide, or any combination thereof. For example, the synthetic polymer may comprises a polyolefin, such as polypropylene, a copolymer including propylene units, a polyethylene, or a copolymer including ethylene units. In accordance with certain embodiments of the invention, for instance, the polymeric material may comprise from about 10 to about 100 wt. % of a polyolefin, such as at least about any of the following: 10, 15, 20, 25, 30, 35, 40, 45, 50, 55, and 60 wt. %, and/or at most about any of the following: 100, 95, 90, 85, 80, 75, 70, 65, and 60 wt. %. Additionally or alternatively, the polymeric material may comprise from about 10 to about 100 wt. % of a polyolefin-containing copolymer, such as from at least about any of the following: 10, 15, 20, 25, 30, 35, 40, 45, and 50 wt. %, and/or at most about any of the following: 100, 95, 90, 85, 80, 75, 70, 65, 60, 55, and 50 wt. %. In accordance with certain embodiments of the invention, for example, the polymeric composition may comprise a blend of the polyolefin and the polyolefin-containing copolymer.

In accordance with certain embodiments of the invention, the first plurality of crimped continuous fibers, the second plurality of crimped continuous fibers, and the third plurality of crimped continuous fibers may independently comprise a plurality of multicomponent fibers (e.g., a first plurality of multicomponent fibers, a second plurality of multicomponent fibers, a third plurality of multicomponent fibers). For example, the first plurality of multicomponent fibers, the second plurality of multicomponent fibers, the third plurality of multicomponent fibers, or any combination thereof may independently from each other comprise at least a first component and a second component. In accordance with certain embodiments of the invention, for instance, the first component may comprise a first polymeric material and the second component may comprise a second polymeric material, wherein the first polymeric material is different than the second polymeric material. The first polymeric material, for example, may comprise a first polyolefin composition and the second polymeric material comprises a second polyolefin composition. The first polyolefin composition, for example, may comprise a first polypropylene and the second polyolefin composition may comprise, for example, a second polypropylene and/or a second polyethylene.

In accordance with certain embodiments of the invention, the first polyolefin composition may comprise a blend of a polyolefin fraction A and a polyolefin fraction B, in which the polyolefin fraction A accounts for more than 50% by weight of the first polyolefin composition and has a polyolefin fraction A-MFR being less than a polyolefin fraction B-MFR of the polyolefin fraction B. In accordance with certain embodiments of the invention, the first polyolefin composition may have a MFR-Ratio between the polyolefin fraction B-MFR and the polyolefin fraction A-MFR from about 15:1 to about 100:1, such as at least about any of the following: 15:1, 20:1, 25:1, 30:1, 35:1, 40:1, 45:1 and 50:1, and/or at most about any of the following: 100:1, 95:1, 90:1, 85:1, 80:1, 75:1. 70:1, 65:1. 60:1, 55:1, and 50:1. Additionally or alternatively, the polyolefin fraction B may comprise from about 0.5% by weight to about 20% by weight of the first polyolefin composition.

In accordance with certain embodiments of the invention, the first plurality of multicomponent fibers, the second plurality of multicomponent fibers, the third plurality of multicomponent fibers or any combination thereof may independently from each other comprise a plurality of bicomponent fibers. In accordance with certain embodiments of the invention, the bicomponent fibers may comprise a sheath/core configuration, a side-by-side configuration, a pie configuration, an islands-in-the-sea configuration, a multi-lobed configuration, or any combinations thereof. In accordance with certain embodiments of the invention, the sheath/core configuration may comprises an eccentric sheath/core configuration (e.g., bi-component fiber) including a sheath components and core component that is not concentrically located within the sheath component. The core component, for example, may define at least a portion of an outer surface of the bicomponent fiber having the eccentric sheath/core configuration in accordance with certain embodiments of the invention.

Figure 2A:
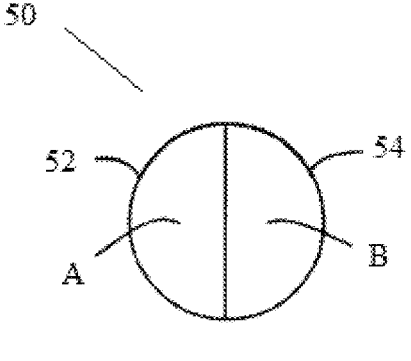
Figure 2B:
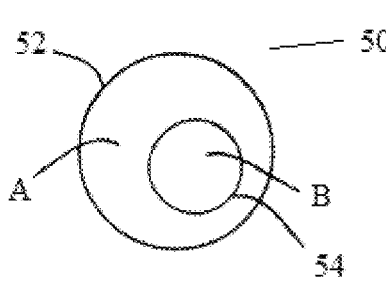
Figure 2C:
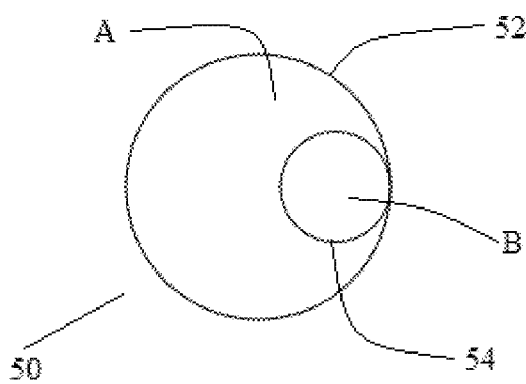
Figure 2H:
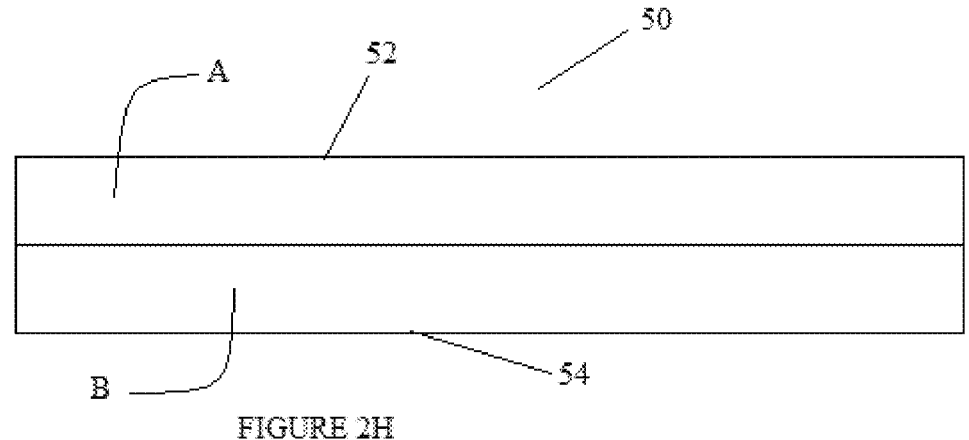

FIGS. 2A-2H illustrate examples of cross-sectional views for some non-limiting examples of multicomponent fibers in accordance with certain embodiments of the invention. As illustrated in FIG. 2A-2H, the multicomponent fibers 50 may comprise a first polymeric component 52 of a first polymeric composition A and a second polymeric component 54 of a second polymeric composition B. The first and second components 52 and 54 can be arranged in substantially distinct zones within the cross-section of the multicomponent fibers that extend substantially continuously along the length of the multicomponent fibers. The first and second components 52 and 54 can be arranged in a side-by-side arrangement in a round cross-sectional fiber as depicted in FIG. 2A or in a ribbon-shaped (e.g., non-round) cross-sectional fiber as depicted in FIGS. 2G and 2H. Additionally or alternatively, the first and second components 52 and 54 can be arranged in a sheath/core arrangement, such as an eccentric sheath/core arrangement as depicted in FIGS. 2B and 2C. In the eccentric sheath/core multicomponent fibers as illustrated in FIG. 2B, one component fully occludes or surrounds the other but is asymmetrically located in the multicomponent fibers to allow fiber crimp (e.g., first component 52 surrounds component 54). Eccentric sheath/core configurations as illustrated by FIG. 2C include the first component 52 (e.g., the sheath component) substantially surrounding the second component 54 (e.g., the core component) but not completely as a portion of the second component may be exposed and form part of the outermost surface of the fiber 50. As additional examples, the multicomponent fibers can comprise hollow fibers as shown in FIGS. 2D and 2E or as multilobal fibers as shown in FIG. 2F. It should be noted, however, that numerous other cross-sectional configurations and/or fiber shapes may be suitable in accordance with certain embodiments of the invention. In the multi-component fibers, in accordance with certain embodiments of the invention, the respective polymer components can be present in ratios (by volume or my mass) of from about 85:15 to about 15:85. Ratios of approximately 50:50 (by volume or mass) may be desirable in accordance with certain embodiments of the invention; however, the particular ratios employed can vary as desired, such as at most about any of the following: 85:15, 80:20, 75:25, 70:30, 65:35, 60:40, 55:45 and 50:50 by volume or mass and/or at least about any of the following: 50:50, 45:55, 40:60, 35:65, 30:70, 25:75, 20:80, and 15:85 by volume or mass.

As noted above, the multicomponent fibers may comprise a first component comprising a first polymeric composition and a second component comprising a second polymeric composition, in which the first polymeric composition is different than the second polymeric composition. For example, the first polymeric composition may comprise a first polyolefin composition and the second polymeric composition may comprise a second polyolefin composition. In accordance with certain embodiments of the invention, the first polyolefin composition may comprise a first polypropylene or blend of polypropylenes and the second polyolefin composition may comprise a second polypropylene and/or a second polyethylene, in which the first polypropylene or blend of polypropylenes has, for example, a melt flow rate that is less than 50 g/10 min. Additionally or alternatively, the first polypropylene or blend of polypropylenes may have a lower degree of crystallinity than the second polypropylene and/or a second polyethylene.

In accordance with certain embodiments of the invention, the first polymeric composition and the second polymeric composition can be selected so that the multi-component fibers develop one or more crimps therein without additional application of heat either in the diffuser section just after the draw unit but before laydown, once the draw force is relaxed, and/or post-treatments such as after fiber lay down and web formation. The polymeric compositions, therefore, may comprise polymers that are different from one another in that they have disparate stress or elastic recovery properties, crystallization rates, and/or melt viscosities. In accordance with certain embodiments of the invention, the polymeric compositions selected to self-crimped by virtue of the melt flow rates of the first and second polymeric compositions as described and disclosed herein. In accordance with certain embodiments of the invention, multi-component fibers, for example, can form or have crimped fiber portions having a helically-shaped crimp in a single continuous direction. For example, one polymeric composition may be substantially and continuously located on the inside of the helix formed by the crimped nature of the fiber.

In accordance with certain embodiments of the invention, for example, the first polymeric composition of the first component may comprise a first MFR from about 10 g/10 min to less than 150 g/10 min, such as at most about any of the following: 150, 125, 100, 80, 60, 50, 48, 46, 44, 42, 40, 38, 36, 35, 34, 32, and 30 g/10 min and/or at least about any of the following: 10, 12, 15, 18, 20, 22, 24, 25, 26, 28, 30, 32, 34, and 35 g/10 min. In accordance with certain embodiments of the invention, the second polymeric composition of the second component may comprise a second MFR from about 20 g/10 min to about 150 g/10 min, such as at most about any of the following: 150, 125, 100, 80, 60, 50, 48, 46, 44, 42, 40, 38, 36, 35, 34, 32, and 30 g/10 min and/or at least about any of the following: 20, 22, 24, 25, 26, 28, 30, 32, 34, and 35 g/10 min. In accordance with certain embodiments of the invention, the difference in the MFR between the first polymeric composition and the second polymeric composition may comprise from about 8 g/10 min to about 100 g/10 min, such as at most about any of the following: 100, 80, 60, 50, 40, 30, 28, 26, 25, 24, 22, 20, 18, 16, 15, 14, 12, 10, and 8 g/10 min and/or at least about any of the following: 8, 10, 12, 14, 15, and 20 g/10 min.

As noted above, the first polyolefin composition may comprise a blend of polyolefin fractions or components (e.g., polypropylene fraction A and a different polypropylene fraction or a copolymer containing propylene units fraction B that are mixed to provide a polypropylene-based blend). For example, the first polyolefin composition may comprise a blend of a polyolefin fraction A and a polyolefin fraction or a copolymer containing propylene units fraction B, wherein the polyolefin fraction A accounts for more than 50% by weight of the first polyolefin composition and has a polyolefin fraction A-MFR (e.g., a low MFR relative to that of polyolefin fraction B) being less than a polyolefin fraction B-MFR of the polyolefin fraction B. In accordance with certain embodiments of the invention, for instance, the first polyolefin composition has a MFR-Ratio between the polyolefin fraction B-MFR (e.g., the higher MFR material of the two) and the polyolefin fraction A-MFR (e.g., the lower MFR material of the two) from about 15:1 to about 100:1, such as at most about any of the following: 100:1, 90:1, 80:1, 75:1, 70:1, 65:1, 60:1, 55:1, 50:1, 45:1, and 40:1 and/or at least about any of the following: 15:1, 18:1, 20:1, 22:1, 24:1, 25:1, 26:1, 28:1, 30:1, 32:1, 34:1, 35:1, and 40:1. In accordance with certain embodiments of the invention, the polyolefin fraction B (e.g., the higher MFR material of the two) comprises from about 0.5% by weight to about 20% by weight of the first polyolefin composition, such as at most about any of the following: 20, 18, 16, 15, 14, 12, 10, 8, and 6% by weight of the first polyolefin composition and/or at least about any of the following: 0.5, 0.075, 1, 2, 3, 4, 5, 6, 7, 8, 9, and 10% by weight of the first polyolefin composition. By way of example, certain embodiments in accordance with the invention may comprise multicomponent fibers in which the first component and the second are formed from the same base polymeric material (e.g., same polypropylene—low MFR polypropylene) with the only difference being the addition of a high MFR polymer or a copolymer containing propylene units (e.g., high MFR polypropylene or copolymers as disclosed herein) to the first component such that the MFR of the first component is larger than the MFR of the second component. In this regard, the high MFR polymer (e.g., high MFR polypropylene as disclosed herein) may comprise the polyolefin fraction B and the base layer having the notably lower MFR may comprise polyolefin fraction A. In accordance with such embodiments of the invention, for instance, the first component may be formed from the blend of polyolefin fraction A and polyolefin fraction B, while the second component may be formed from polyolefin fraction B. In accordance with certain embodiments of the invention, the only difference between the first component and the second component may be the addition of the polyolefin fraction B to the first component. In accordance with certain additional embodiments of the invention, the first component may be formed from the blend of polyolefin fraction A and polyolefin fraction B while the second component may be formed from a polyethylene or polypropylene in "neat" or unmodified form.

Additionally or alternatively, the multicomponent fibers in accordance with certain embodiments of the invention, may comprise a mass or volume ratio between the first component and the second component ranging from about 85:15 to about 15:85 (by volume or mass), such as at most about any of the following: 85:15, 80:20, 75:25, 70:30, 65:35, 60:40, 55:45 and 50:50 by volume or mass and/or at least about any of the following: 50:50, 45:55, 40:60, 35:65, 30:70, 25:75, 20:80, and 15:85 by volume or mass.

In accordance with certain embodiments of the invention, the multicomponent fibers may comprise an average free crimp percentage from about 30% to about 300% (e.g., 30%-100%), such as at most about any of the following: 300, 275, 250, 225, 200, 175, 150, 125, 100, and 75% and/or at least about any of the following: 20, 30, 40, 50, 75, 100, 125, 150, 175, and 200%. The multicomponent fibers, in accordance with certain embodiments of the invention, may include a plurality of discrete zig-zag configured crimped portions, a plurality of discrete or continuously coiled or helically configured crimped portions, or a combination thereof. The average free crimp percentage may be ascertained by determining the free crimp length of the fibers in question with an Instron 5565 equipped with a 2.5N load cell. In this regard, free or unstretched fiber bundles may be placed into clamps of the machine. The free crimp length can be measured at the point where the load (e.g., 2.5 N load cell) on the fiber bundle becomes constant. The following parameters are used to determine the free crimp length: (i) Record the Approximate free fibers bundle weight in grams (e.g., xxx g±0.002 grams); (ii) Record the Unstretched bundle length in inches; (iii) Set the Gauge Length (i.e., the distance or gap between the clamps holding the bundle of fibers) of the Inston to 1 inch; and (iv) Set the Crosshead Speed to 2.4 inches/minute. The free crimp length of the fibers in question may then be ascertained by recording the extension length of the fibers at the point where the load becomes constant (i.e., the fibers are fully extended). The average free crimp percentage may be calculated from the free crimp length of the fibers in question and the unstretched fiber bundles length (e.g., the gauge length). For example, a measured free crimp length of 32 mm when using a 1 inch (25.4 mm) gauge length as discussed above would provide an average free crimp percentage of about 126%. The foregoing method to determining the average free crimp percentage may be particularly beneficial when evaluating continuous fibers having helically coiled crimps. For instance, traditional textile fibers are mechanically crimped and can be measured optically but continuous fibers having helically coiled crimped portions cause errors in trying to optically count "crimp" in such fibers.

In accordance with certain embodiments of the invention, the multicomponent fibers may comprise a plurality of three-dimensional crimped portions having an average diameter (e.g., based on the average of the longest length defining an individual crimped portion) from about 0.5 mm to about 5 mm, such as at most about any of the following: 5, 4.75, 4.5, 4.25, 4, 3.75, 3.5, 3.25, 3, 2.9, 2.8, 2.7, 2.6, 2.5, 2.4, 2.3, 2.2, 2.1, 2, 1.9, 1.8, 1.7, 1.6, and 1.5 mm and/or at least about any of the following: 0.5, 0.6, 0.07, 0.8, 0.9, 1, 1.1, 1.2, 1.3, 1.4, 1.5, 1.6, 1.7, 1.8, 1.9, and 2 mm. In accordance with certain embodiments of the invention, the average diameter of the plurality of three-dimensional crimped portions can be ascertained by use of a digital optical microscope (Manufactured by HiRox in Japan KH-7700) to view multicomponent fibers samples and obtain digital measurement of loop diameters of the three-dimensional crimped portions of the SMFs. Magnification ranges generally in the 20× to 40× can be used to ease evaluation of the loop diameter formed from the three-dimensional crimping of the multicomponent fibers.

In accordance with certain embodiments of the invention, the first spunbond layer, the second spunbond layer, the third spunbond layer, or any combination thereof may include a slip agent. In this regard, the plurality of fibers forming any of the layers of the nonwoven fabric may include one or more slip agents incorporated within the body (e.g., within the melt that was spun to form the fibers) of the fibers and/or topically applied to the outer surfaces of the fibers. For example, the slip agent may be dispersed throughout at least a portion of a body portion of the first plurality of crimped continuous fibers, the second plurality of crimped continuous fibers, the third plurality of crimped continuous fibers, or any combination thereof. Additionally or alternatively, the slip agent may be topically located on at least a portion of an outer surface of the first plurality of crimped continuous fibers, the second plurality of crimped continuous fibers, the third plurality of crimped continuous fibers, or any combination thereof.

In accordance with certain embodiments of the invention, the slip agent may comprise an amide. For example, the slip agent may comprise a primary amide, a secondary amide, a tertiary amide, a bis-amide, or any combination thereof. In accordance with certain embodiments of the invention, the slip agent may comprise one or more primary amides comprising erucamide, oleamide, strearamide, behenamide, or any combination thereof. Additionally or alternatively, the slip agent may comprise one or more bis-amide comprising an ethylene bis-amide.

In accordance with certain embodiments of the invention, the slip agent comprises one or more amides, in which the one or more amides comprises an unsaturated aliphatic chain, a saturated aliphatic chain, or a combination thereof. In accordance with certain embodiments of the invention, the one or more aliphatic chains may each independently comprise from about 1 to about 30 carbon atoms (e.g., about 5 to about 30 carbon atoms). For example, a secondary amides and bis-amides may comprise two saturated and/or unsaturated carbon chains the may each independently comprise from about 1 to about 30 carbon atoms (e.g., about 5 to about 30 carbon atoms). By way of example only, the one or more aliphatic chains may each independently comprise from at least about any of the following: 1, 5, 10, 15, 16, 17, 18, 19, 20, 21, 22, 23, 24, and 25 carbon atoms and/or at most about 30, 29, 28, 27, 26, 25, 20, and 15 carbon atoms (e.g., about 15 to about 25 carbon atoms, about 20 to 30 carbon atoms, etc.). In accordance with certain embodiments of the invention, the slip agent may comprise an amide including an unsaturated aliphatic chain having one or more elements or unsaturation. An element of unsaturation corresponds to two fewer hydrogen atoms than in the saturated formula. For example, a single double bound accounts for one element of unsaturation, while a triple bond would account for two elements of unsaturation. In accordance with certain embodiments of the invention, the slip agent includes an unsaturated aliphatic chain comprising from about 1 to about 10 elements of unsaturation (e.g., 1, 2, 3, 4, 5, 6, 7, 8, 9, or 10 elements of saturation).

In accordance with certain embodiments of the invention, the slip agent may comprise a combination of a greater amount of, for example, stearamide and a lesser amount of, for example, erucamide. For example, the combination of the greater amount of stearamide and the lesser amount of erucamide may comprise from about 25 to about 40 weight percent erucamide and from about 60 to about 75 weight percent stearamide.

In accordance with certain embodiments of the invention, the first plurality of crimped continuous fibers may comprise from 0 to about 5 wt. % of the slip agent, such as at least about any of the following: 0, 0.2, 0.4, 0.5, 0.6, 0.8, 1, 1.2, 1.4, 1.5, 1.6, 1.8, and 2 wt. %, and/or at most about any of the following: 5, 4.8, 4.5, 4.2, 4, 3.8, 3.5, 3.2, 3, 2.8, 2.5, 2.2, and 2 wt. %. Additionally or alternatively, the second plurality of crimped continuous fibers may comprise from 0 to about 5 wt. % of the slip agent, such as at least about any of the following: 0, 0.2, 0.4, 0.5, 0.6, 0.8, 1, 1.2, 1.4, 1.5, 1.6, 1.8, and 2 wt. %, and/or at most about any of the following: 5, 4.8, 4.5, 4.2, 4, 3.8, 3.5, 3.2, 3, 2.8, 2.5, 2.2, and 2 wt. %. Additionally or alternatively, the third plurality of crimped continuous fibers may comprise from 0 to about 5 wt. % of the slip agent, such as at least about any of the following: 0, 0.2, 0.4, 0.5, 0.6, 0.8, 1, 1.2, 1.4, 1.5, 1.6, 1.8, and 2 wt. %, and/or at most about any of the following: 5, 4.8, 4.5, 4.2, 4, 3.8, 3.5, 3.2, 3, 2.8, 2.5, 2.2, and 2 wt. %.

In accordance with certain embodiments of the invention, the first spunbond layer, the second spunbond layer, the third spunbond layer, or any combination thereof may include a hydrophilic additive and/or an antistatic additive. In this regard, the plurality of fibers forming any of the layers of the nonwoven fabric may include one or more hydrophilic additives and/or one or more antistatic additives incorporated within the body (e.g., within the melt that was spun to form the fibers) of the fibers and/or topically applied to the outer surfaces of the fibers. For example, a hydrophilic additive and/or an antistatic additive may be dispersed throughout at least a portion of a body portion of the first plurality of crimped continuous fibers, the second plurality of crimped continuous fibers, the third plurality of crimped continuous fibers, or any combination thereof. Additionally or alternatively, a hydrophilic additive and/or an antistatic additive may be topically located on at least a portion of an outer surface of the first plurality of crimped continuous fibers, the second plurality of crimped continuous fibers, the third plurality of crimped continuous fibers, or any combination thereof.

In accordance with certain embodiments of the invention, the first spunbond layer, the second spunbond layer, the third spunbond layer, or any combination thereof may include an antistatic treatment. The antistatic treatment, for example, may be required for some fabrics to prevent sparking or dust particles building up on the surface of the fabric. In accordance with certain embodiments of the invention, antistatic additive(s) may be blended and extruded with polymer (hot melt) forming the plurality of the fibers forming the first spunbond layer, the second spunbond layer, the third spunbond layer, or any combination thereof. The antistatic additive may comprise a topical surfactant applied onto at least one surface of the fabric. The antistatic additive is not necessarily limited, but may include a nonionic (polyethylene glycol fatty acid ester, fatty acid diethanolamides), anionic (alcohol sulfuric acid ester salt), cationic (quaternary ammonium compounds), and an amphoteric surfactant.

In accordance with certain embodiments of the invention, the first spunbond layer may comprise from about 0 to about 5 wt. % of the antistatic additive, such as at least about any of the following: 0, 0.1, 0.3, 0.5, 0.8, 1, 1.2, 1.4, 1.6, 1.8, 2, 2.2, 2.4, and 2.6 wt. % of the antistatic additive, and/or at most about any of the following: 5, 4.5, 4, 3.5, 3, and 2.6 wt. % of the antistatic additive. Additionally or alternatively, the second spunbond layer may comprise from about 0 to about 5 wt. % of the antistatic additive, such as at least about any of the following: 0, 0.1, 0.3, 0.5, 0.8, 1, 1.2, 1.4, 1.6, 1.8, 2, 2.2, 2.4, and 2.6 wt. % of the antistatic additive, and/or at most about any of the following: 5, 4.5, 4, 3.5, 3, and 2.6 wt. % of the antistatic additive. Additionally or alternatively, the third spunbond layer may comprise from about 0 to about 5 wt. % of the antistatic additive, such as at least about any of the following: 0, 0.1, 0.3, 0.5, 0.8, 1, 1.2, 1.4, 1.6, 1.8, 2, 2.2, 2.4, and 2.6 wt. % of the antistatic additive, and/or at most about any of the following: 5, 4.5, 4, 3.5, 3, and 2.6 wt. % of the antistatic additive. In accordance with certain embodiments of the invention, the first spunbond layer may include a larger amount of the antistatic additive then the third spunbond layer.

In accordance with certain embodiments of the invention, the nonwoven fabric may be formed entirely from a plurality of spunbond layers, such as from about 2 to about 10 spunbond layers (e.g., 3, 4, 5, 6, 7, 8, and 9 spunbond layers). As noted above, for instance, the nonwoven fabric may be devoid of meltblown fibers and/or sub-micron fibers.

In accordance with certain embodiments of the invention, the nonwoven fabric may have a machine direction (MD) tensile strength from about 50 to about 150 N/5 cm, such as at least about any of the following: 50, 55, 60, 65, 70, 75, 80, 85, and 90 N/5 cm, and/or at most about any of the following: 150, 145, 140, 135, 130, 125, 120, 115, 110, 105, 100, 95, and 90 N/5 cm. Additionally or alternatively, the nonwoven fabric may have a cross direction (CD) tensile strength from about 25 to about 85 N/5 cm, such as at least about any of the following: 25, 30, 32, 35, 38, 40, 42, 45, 48, and 50 N/5 cm, and/or at most about any of the following: 85, 80, 75, 70, 65, 60, 55, and 50 N/5 cm.

In accordance with certain embodiments of the invention, the nonwoven fabric may have a MD elongation of from about 20 to about 180%, such as at least about any of the following: 20, 30, 40, 50, 60, 70, 75, 80, 85, and 90%, and/or at most about any of the following: 180, 175, 170, 165, 160, 155, 150, 145, 140, 135, 130, 125, 120, 115, 110, 105, 100, 95, and 90%. Additionally or alternatively, the nonwoven fabric may have a CD elongation of from about 20 to about 180%, such as at least about any of the following: 20, 30, 40, 50, 60, 70, 75, 80, 90, 100, 110, and 115%, and/or at most about any of the following: 180, 170, 160, 150, 140, 130, 125, 120, and 115%.

The nonwoven fabric, in accordance with certain embodiments of the invention, may have a thickness in a z-direction that is perpendicular to the CD and the MD of the nonwoven fabric, in which the thickness may be from about 0.3 to about 3 mm at 0.2 kPa, such as at least about any of the following: 0.3, 0.4, 0.5, 0.6, 0.7, and 0.8 mm at 0.2 kPa, and/or at most about 3, 2.8, 2.6, 2.5, 2.2, 2, 1.8, 1.6, 1.5, 1.4, 1.3, 1.2, 1.1, 1, 0.9, and 0.8 mm at 0.2 kPa (e.g., from 0.3 to 1.5 mm at 0.2 kPa). Additionally or alternatively, the nonwoven fabric may have an air permeability of from about 40 to about 600 cfm, such as at least about any of the following: 40, 60, 80, 100, 120, 140, 150, 160, 170, 180, 190, 200, 210, 220, 230, 240, and 250 and/or at most about 600, 570, 540, 510, 480, 450, 420, 400, 390, 380, 360, 350, 330, 320, 300, 290, 280, 270, 260, and 250 cfm. Additionally or alternatively, the nonwoven fabric may have a hydrostatic head from about 15 bar to about 30 mbar determined according to AATCC 127, such as at least about any of the following: 15, 16, 18, 20, 22, and 25 mbar, and/or at most about any of the following: 30, 28, 26, 25 mbar. Additionally or alternatively, the nonwoven fabric may have a hydrostatic head to basis weight ratio from about 0.3 to about 0.7 (mbar/gsm), such as at least about any of the following: 0.3, 0.32, 0.34, 0.36, 0.38, 0.4, 0.42, 0.44, 0.46, 0.48, and 0.5 (mbar/gsm), and/or at most about any of the following: 0.7, 0.68, 0.66, 0.64, 0.62, 0.6, 0.58, 0.56, 0.54, 0.52, and 0.5 (mbar/gsm), wherein the hydrostatic head is determined according to AATCC 127.

In accordance with certain embodiments of the invention, the nonwoven fabric may have a Compress Average Rigidity (CAR) from about 300 to about 650 (gf/cm$^2$)/mm, such as at least about any of the following: 300, 320, 350, 380, 400, 420, 440, 460, 480, 500, 520, and 540 (gf/cm$^2$)/mm, and/or at most about any of the following: 650, 640, 620, 600, 580, 560, and 540 (gf/cm$^2$)/mm. Additionally or alternatively, the nonwoven fabric may have a Recovery Average Rigidity (RAR) from about 500 to about 1200 (gf/cm$^2$)/mm, such as at least about any of the following: 500, 520, 550, 580, 600, 620, 650, 680, 700, 720, 740, 760, 780, 800, 820, 840, 860, 880, and 900 (gf/cm$^2$)/mm, and/or at most about any of the following: 1200, 1150, 1100, 1050, 1000, 950, and 900 (gf/cm$^2$)/mm. Additionally or alternatively, the nonwoven fabric may have a first ratio of the CAR in (gf/cm$^2$)/mm to the RAR in (gf/cm$^2$)/mm from about 55 to about 90, such as about 55, 58, 60, 62, 64, 65, 68, and 70, and/or at most about any of the following: 90, 88, 85, 82, 80, 78, 75, 72 and 70.

In accordance with certain embodiments of the invention, the nonwoven fabric may have a Bending Average Rigidity in the CD (BARCD) from about 10 to about 50 gf*mm/rad, such as at least about any of the following: 10, 12, 15, 18, 20, 22, 24, 25, 26, 28, 30, 32, 34, 35, 36, and 38 gf*mm/rad, and/or at most about any of the following: 50, 48, 46, 45, 44, 42, 40, and 38 gf*mm/rad. Additionally or alternatively, the nonwoven fabric may have a Bending Average Rigidity in the MD (BARMD) from about 30 to about 110 gf*mm/rad, such as at least about any of the following: 30, 35, 40, 45, 50, 55, 60, 65, 70, 75, 80, and 85 gf*mm/rad, and/or at most about any of the following: 110, 105, 100, 95, 90, and 85 gf*mm/rad. Additionally or alternatively, the nonwoven fabric may have a Bending Average Rigidity Factor per Basis Weight (BRAF) from about 0.8 gf*mm/rad per gsm to about 1.5 gf*mm/rad per gsm determined by Formula (1):

$$[(BARCD+BARMD)/2]/BW, \qquad \text{Formula (1):}$$

wherein BARCD and BARMD are defined above and BW is the basis weight for the nonwoven fabric. In accordance with certain embodiments of the invention, for example, the BRAF may be from about 0.8 to about 1.5 gf*mm/rad per gsm, such as at least about any of the following: 0.8, 0.85, 0.9, 0.95, 1, 1.05, 1.1, 1.15, 1.2, 1.25, and 1.3 gf*mm/rad per gsm, and/or at most about any of the following: 1.5, 1.45, 1.4, 1.35, and 1.3 gf*mm/rad per gsm.

In accordance with certain embodiments of the invention, the nonwoven fabric may optionally include one or more layers of staple fibers and/or cellulosic fibers (e.g., rayon, pulp, cotton, etc.). In accordance with certain embodiments of the invention, the nonwoven fabric may be devoid of staple fibers, cellulosic fibers, or both.

In another aspect, the invention provides a method of forming a nonwoven fabric, such as those described and disclosed herein. The method may comprise providing or forming a first spunbond layer comprising a first plurality of crimped continuous fibers, providing or forming a second spunbond layer comprising a second plurality of crimped continuous fibers, and providing or forming a third spunbond layer comprising a third plurality of crimped continuous fibers. The method may also comprise locating the second spunbond layer directly or indirectly between the first spunbond layer and the third spunbond layer. The method may also comprise a step or steps of bonding or consolidating the first spunbond layer, the second spunbond layer, and the third spunbond layer together to form the nonwoven fabric, wherein the nonwoven fabric has a thickness of at least about 0.3 mm and hydrostatic head of at least about 15 mbar.

The step or steps of bonding or consolidating the first spunbond layer, the second spunbond layer, and the third spunbond layer together to form the nonwoven fabric may comprises one or more consolidation means, such as those described herein. For example, the bonding or consolidation means for forming the nonwoven fabric may include a thermal bonding process, a mechanical bonding process, a chemical bonding process, a through-air-bonding process, or any combination thereof. In accordance with certain embodiments of the invention, the bonding or consolidation step(s) may comprise a thermal bonding process comprising an ultrasonic bonding operation and/or a thermal calendaring operation. The thermal bonding process, for example, may define a bonding pattern including a plurality of individual and separate bonding sites. In this regard, the plurality of individual and separate bonding sites may define a bonded area. In accordance with certain embodiments of the invention, the bonded area may comprise from about 1 to about 30%, such as at least about any of the following: 1, 2, 3, 5, 8, 10, 12, 15, 18, and 20%, and/or at most about any of the following: 30, 28, 25, 22, and 20%.

In accordance with certain embodiments of the invention, the method may comprise treating the first spunbond layer, the second spunbond layer, the third spunbond layer, or any combination thereof with one or more slip agents as disclosed above and/or one or more antistatic additives as disclosed above. For example, the method may comprise forming a first polymeric melt including a first antistatic additive and/or a first slip agent, and meltspinning the first plurality of crimped continuous fibers, wherein the first plurality of crimped continuous fibers may be self-crimping in nature or crimpable in nature via a post-laydown crimping operation (e.g., thermally-induced crimping and/or mechanically formed crimps). Additionally or alternatively, the method may comprise forming a second polymeric melt including a second antistatic additive and/or a second slip agent, and meltspinning the second plurality of crimped continuous fibers, wherein the second plurality of crimped continuous fibers may be self-crimping in nature or crimpable in nature via a post-laydown crimping operation. Additionally or alternatively, the method may comprise forming a third polymeric melt including a third antistatic additive and/or a third slip agent, and meltspinning the third plurality of crimped continuous fibers, wherein the third plurality of crimped continuous fibers may be self-crimping in nature or crimpable in nature via a post-laydown crimping operation (e.g., thermally-inducing the formation of crimps and/or mechanically forming crimps).

In accordance with certain embodiments of the invention, the step of treating the first spunbond layer, the second spunbond layer, the third spunbond layer, or any combination thereof with one or more antistatic additives and/or one or more slip agents may comprise topically applying the one or more antistatic additives and/or the one or more slip agents to the outer surfaces of the fibers being treated. For example, the method may comprise topically applying the antistatic additive and/or the slip agent to the first spunbond layer, the second spunbond layer, the third spunbond layer, or any combination thereof.

In accordance with certain embodiments of the invention, the method may comprise subjecting the first spunbond layer, the second spunbond layer, the third spunbond layer, or any combination thereof to a post-laydown crimping operation (e.g., mechanical and/or thermal crimping operation to impart the plurality of crimped portions to the fibers being processed).

In accordance with certain embodiments of the invention, the method may comprise depositing the a first spunbond nonwoven web (e.g., first spunbond layer) on a support belt, directly depositing a second spunbond nonwoven web (e.g., second spunbond layer) on top of the first nonwoven web, and directly depositing a third spunbond nonwoven web (e.g., third spunbond layer) on top of the second nonwoven web to form a multilayer precursor nonwoven web. The multilayer precursor nonwoven web may then be subjected to one or more consolidating operations, such as those described and disclosed herein, to form the nonwoven fabric. As noted above, the plurality of fibers forming each spunbond layer may comprise naturally crimped continuous fibers and/or crimpable fibers, which may be imparted with one or more crimps prior to and/or after consolidation. Alternatively, each of the spunbond layers may be pre-formed as individual spunbond fabrics that have been pre-consolidated. These spunbond layers may be layered on top of one another and consolidated together to form the nonwoven fabric.

In yet another aspect, the invention provides a protective article including a nonwoven fabric as described and disclosed herein, in which the entirety of the protective article or at least a portion thereof is formed from the nonwoven fabric. For instance, the protective article comprises a drape (e.g., a surgical drape), a garment (e.g., clean air suit or surgical clothing), or a portion of a garment (e.g., clean air suit). In accordance with certain embodiments of the invention the nonwoven fabric and/or the protective article (e.g., a clean air suit) may have a microbial penetration—Dry of less than 100 CFU, such as less than 50 CFU or less than 20 CFU, as determined by EN ISO 22612 using a challenge concentration of 108 CFU/gram of talcum and 30 minute vibration time. Additionally or alternatively, the nonwoven fabric and/or the protective article may have a cleanliness microbial bioburdon of less than 100 CFU/100 cm$^2$ as determined by EN ISO 11737-1.

EXAMPLES

The present disclosure is further illustrated by then following examples, which in no way should be construed as being limiting. That is, the specific features described in the following examples are merely illustrative and not limiting.

A nonwoven fabric consisting of three spunbond layers was prepared in accordance with certain embodiments of the invention. The total basis weight of the nonwoven fabric was 45 gsm. In particular, each spunbond layer included a plurality of continuous spunbond fibers have a plurality of crimped portions therein (e.g., crimped continuous fibers). All of the fibers of each layer were formed from a single polymeric system. In this regard, the polymeric composition of the fibers in each spunbond layer were the same. The polymeric composition utilized included about 61 wt. % of a polypropylene, about 36 wt. % of a polyolefin-based random copolymer, about 2 wt. % of a coloring pigment, and about 1 wt. % of a slip additive (i.e., erucamide). The nonwoven fabric was particularly lofty, and can be described as a high loft nonwoven fabric.

Samples of the foregoing nonwoven fabric were tested for resistance to dry microbial penetration according to ISO 22612(2005) and EN 13795-2 (2019). Twelve test specimens of a 20 cm by 20 cm size were obtained (i.e., 2 tests of 5 test specimens plus 1 test specimen as a control). Test specimen conditioning was 20° C. at 65% relative humidity for 24 hours. The test specimens were then sterilized by steam at a temperature of 121° C. for 15 minutes. A first side of the test specimens were contacted with talc, which *Bacillus atrophaeus* spores ATCC 9372 (deposited as *Bacillus subtilis* var. *niger* at ATCC). The talc count was $10^8$ CFU/g. The vibration frequency was 20,800 vibrations per minute and the vibration time was 30 minutes. The test results are provided below in Table 1A and Table 1B.

TABLE 1A

| | Run 1 CFU/plate | Run 2 CFU/plate |
|---|---|---|
| Control | 0 | 0 |
| Test specimen#1 | 34 | 24 |
| Test specimen#2 | 37 | 24 |
| Test specimen#3 | 14 | 36 |
| Test specimen#4 | 20 | 23 |
| Test specimen#5 | 17 | 47 |

TABLE 1B

| | |
|---|---|
| Median ($M_d$) | 24 |
| Upper quartile ($U_q$) | 36 |

A second nonwoven fabric was made in the same manner as the foregoing nonwoven fabric, with the exception that the total basis weight of the nonwoven fabric was 50 gsm. This nonwoven fabric was subjected to a variety of tests to evaluate several physical properties of the nonwoven fabric. A comparative nonwoven fabric was also tested to provide a side-by-side comparison. The comparative nonwoven fabric was a commercially available spunbond having a basis weight of 49 gsm. In this regard, the comparative nonwoven fabric was a mono-spunbond produced by blending polypropylene resins, polyolefin-based random copolymer resins, and slip additives to deliver softness. Tables 2 and 3, which are provided below, summarize several of the physical properties analyzed for both the comparative nonwoven fabric and the nonwoven fabric formed in accordance with certain embodiments of the invention (e.g., inventive nonwoven fabric).

TABLE 2

| Bonding Area ANT Treatment Property | Unit | 10.50% Master Batch S-TEX 49 g Blue | 12% Surface Treatment 820B 50 g High Loft Blue8 Sample | Test Method | Test Conditions |
|---|---|---|---|---|---|
| B.W. | gsm | 49.16 | 49.90 | ASTM D 3776 | Sample: 100 mm*100 mm |
| MD Tensile Strength | N/5 cm | 103.52 | 74.04 | ASTM D5035 | Sample size 50 mm, Gap: |
| MDT-25% Elongation | gf | 6274.07 | 4176.34 | | 100 mm; Speed 300 mm/min |
| MD Elongation | % | 101.08 | 83.52 | | |
| MD Elongation @5 N | % | 0.87 | 1.61 | | |
| MD Elongation @10 N | % | 1.54 | 3.19 | | |
| CD Tensile Strength | N/5 cm | 28.76 | 42.02 | | |
| CD Elongation | % | 146.98 | 116.63 | | |
| Thickness @0.2 kPa | mm | 0.44 | 0.51 | FZ/T 60004-91 | 0.2 kPa, Dia. 56 mm 50CN |
| Thickness @0.5 kPa | mm | 0.43 | 0.45 | ISO 9073-2 | 0.5 kPa, Dia. 56 mm 125CN |
| Thickness @1.44 kPa | mm | 0.38 | 0.42 | | 1.44 kPa, Dia. 50 mm 300CN |
| Air Perm. | cfm | 381.30 | 239.70 | ASTM D737 | 38 cm², 125 pa |
| Fiber diameter (S side) | um | 22.96 | 14.41 | | SEM |
| Fiber denier (S side) | den | 3.40 | 1.34 | | SEM |
| Fiber diameter (E side) | um | 21.69 | 16.17 | | SEM |
| Fiber denier (E side) | den | 3.03 | 1.68 | | SEM |
| MD friction coefficient Us | us | 0.28 | 0.18 | ASTM D1894 | Balance 3 days, S/S speed: |
| MD friction coefficient Ud | ud | 0.21 | 0.10 | | 150 mm/min |
| CD friction coefficient Us | us | 0.51 | 0.34 | | |
| CD friction coefficient Ud | ud | 0.38 | 0.24 | | |
| HOM-MD (Gap ¼") | g | 33.18 | 29.78 | WSP 90.3 | Balance 3 days, Gap: ¼" |
| HOM-CD (Gap ¼") | g | 10.82 | 15.22 | | |
| HSH | mbar | N/A (water penetrate) | 19.28 | AATCC 127 | 60 mbar/min |
| Statis decay (55% RH, 50% Off) | s | 0.38 | 0.01 | WSP 40.2 | 55% RH, decay to 50% |

TABLE 3

| Internal Control Unit | BARa gf*mm/rad | BARe gf*mm/rad | T mm | CAR gf*cm-2*mm-1 | RAR gf*cm-2*mm-1 | SFCe |
|---|---|---|---|---|---|---|
| Items | Bending Average Rigidity Y direction | Bending Average Rigidity X direction | Thickness @ 0.04 kPa | Compress Average Rigidity | Recovery Average Rigidity | Surface Friction Coefficient X Direction |
| Hand feeling Note | CD softness Small value means softer | MD softness Smaller value means softer | Bulkiness Higher value means more bulky | Bulkiness Smaller better | Bulkiness Smaller better | Slippery Smaller more slippery |
| Comparative NW Fabric | 33.65 | 127.52 | 0.62 | 673.92 | 1326.35 | 0.18 |
| Inventive NW Fabric | 37.76 | 85.01 | 0.61 | 534.20 | 880.30 | 0.25 |

The test methods used Table 2 were as follows: Basis weight (B.W.) was determined according to ASTM D 3776; all strength and elongation properties were determined according to ASTM D5035; Air permeability was determined according to ASTM D737; H-O-M was determined according to WSP 90.3; Hydrostatic head (HSH) was determined according to AATCC 127; and Static decay was determined according to WSP 40.2. All tests from Table 3 were tested are from FTT (SDL ATLAS Fabric Touch Tester).

These and other modifications and variations to the invention may be practiced by those of ordinary skill in the art without departing from the spirit and scope of the invention, which is more particularly set forth in the appended claims. In addition, it should be understood that aspects of the various embodiments may be interchanged in whole or in part. Furthermore, those of ordinary skill in the art will appreciate that the foregoing description is by way of example only, and it is not intended to limit the invention as further described in such appended claims. Therefore, the spirit and scope of the appended claims should not be limited to the exemplary description of the versions contained herein.

That which is claimed:

1. A nonwoven fabric, comprising:
(i) a first spunbond layer comprising a first plurality of crimped continuous fibers, wherein the first plurality of crimped continuous fibers are formed from a single polymeric composition;
(ii) a second spunbond layer comprising a second plurality of crimped continuous fibers; and
(iii) a third spunbond layer comprising a third plurality of crimped continuous fibers, wherein the second spunbond layer is located directly between the first spunbond layer and the third spunbond layer;
wherein the nonwoven fabric has a thickness of at least about 0.3 mm at 0.2 kPa as measured in accordance with FZ/T60004-91, and hydrostatic head of at least about 15 mbar as measured in accordance with AATCC 127.

2. The nonwoven fabric of claim 1, wherein the first spunbond layer, the second spunbond layer, and the third spunbond layer independently from each other have a basis weight from about 10 to about 30 grams-per-meter squared (gsm).

3. The nonwoven fabric of claim 1, wherein the first plurality of crimped continuous fibers, the second plurality of crimped continuous fibers, and the third plurality of crimped continuous fibers independently from each other have an average diameter from about 8 to about 30 microns.

4. The nonwoven fabric of claim 1, wherein the first plurality of crimped continuous fibers, the second plurality of crimped continuous fibers, and the third plurality of crimped continuous fibers independently from each other have an average denier from about 0.6 to about 3.

5. The nonwoven fabric of claim 1, wherein the first plurality of crimped continuous fibers comprise a first plurality of monocomponent fibers, and/or the second plurality of crimped continuous fibers comprise a second plurality of monocomponent fibers, and/or the third plurality of crimped continuous fibers comprise a third plurality of monocomponent fibers.

6. The nonwoven fabric of claim 5, wherein the first plurality of monocomponent fibers, the second plurality of monocomponent fibers, and the third monocomponent fibers independently from each other comprise a respective polymeric material comprising a respective blend of a polyolefin and a polyolefin-containing copolymer.

7. The nonwoven fabric of claim 6, wherein each of the respective polymeric materials comprises from about 40 to about 100 wt. % of a polyolefin and from about 10 to about 50 wt. % of a polyolefin-containing copolymer.

8. The nonwoven fabric of claim 1, wherein the first spunbond layer, the second spunbond layer, the third spunbond layer, or any combination thereof includes a slip agent, wherein the slip agent comprises an amide.

9. The nonwoven fabric of claim 8, wherein the slip agent comprises one or more primary amides comprising erucamide, oleamide, strearamide, behenamide, or any combination thereof.

10. The nonwoven fabric of claim 8, wherein the slip agent comprises a combination of a greater amount of stearamide and a lesser amount of erucamide.

11. The nonwoven fabric of claim 1, wherein the nonwoven fabric is devoid of meltblown fibers.

12. The nonwoven fabric of claim 1, wherein the nonwoven fabric has a hydrostatic head from about 15 mbar to about 30 mbar.

13. The nonwoven fabric of claim 1, wherein the nonwoven fabric has a Compress Average Rigidity (CAR) from about 300 to about 650 (gf/cm²)/mm, a Recovery Average Rigidity (RAR) from about 500 to about 1200 (gf/cm²)/mm, or both.

14. The nonwoven fabric of claim 13, wherein the nonwoven fabric has a first ratio of the CAR in (gf/cm²)/mm to the RAR in (gf/cm²)/mm from about 55 to about 90.

15. The nonwoven fabric of claim 1, wherein the nonwoven fabric has a Bending Average Rigidity in the CD (BARCD) from about 10 to about 50 gf*mm/rad, a Bending Average Rigidity in the MD (BARMD) from about 30 to about 110 gf*mm/rad, or both.

16. The nonwoven fabric of claim 15, wherein the non-woven fabric has a Bending Average Rigidity Factor per Basis Weight (BRAF) from about 0.8 to about 1.5 gf*mm/rad per gsm determined by Formula (1):

$$[(BARCD+BARMD)/2]/BW, \qquad \text{Formula (1)}$$

wherein BW is the basis weight for the nonwoven fabric.

17. A nonwoven fabric, comprising:
(i) a first spunbond layer comprising a first plurality of crimped continuous fibers, wherein the first plurality of crimped continuous fibers comprise a first plurality of monocomponent fibers having a polymeric composition including (a) from 40 to 80% by weight of a polypropylene, (b) from 10 to 50% by weight of a polyolefin-containing copolymer, and (c) from 0.2 to 5% by weight of a slip agent;
(ii) a second spunbond layer comprising a second plurality of crimped continuous fibers; and
(iii) a third spunbond layer comprising a third plurality of crimped continuous fibers, wherein the second spunbond layer is located directly between the first spunbond layer and the third spunbond layer;
wherein the nonwoven fabric has a thickness of at least about 0.3 mm at 0.2 kPa as measured in accordance with FZ/T60004-91, and hydrostatic head of at least about 15 mbar as measured in accordance with AATCC 127.

18. The nonwoven fabric of claim 17, wherein the slip agent comprises erucamide, oleamide, strearamide, behenamide, or any combination thereof.

19. A method of forming a nonwoven fabric, comprising:
(i) providing or forming a first spunbond layer comprising a first plurality of crimped continuous fibers, wherein the first plurality of crimped continuous fibers are formed from a single polymeric composition;
(ii) providing or forming a second spunbond layer comprising a second plurality of crimped continuous fibers;
(iii) providing or forming a third spunbond layer comprising a third plurality of crimped continuous fibers; and
(iv) bonding the first spunbond layer, the second spunbond layer, and the third spunbond layer together to form the nonwoven fabric; wherein the nonwoven fabric has a thickness of at least about 0.3 mm at 0.2 kPa as measured in accordance with FZ/T60004-91 and hydrostatic head of at least about 15 mbar as measured in accordance with AATCC 127.

20. The method of claim 19, wherein the bonding the first spunbond layer, the second spunbond layer, and the third spunbond layer together to form the nonwoven fabric comprises a thermal bonding process, a mechanical bonding process, a chemical bonding process, a through-air-bonding process, or any combination thereof.

21. A protective article, comprising a drape or garment including a nonwoven fabric according to claim 1.

22. The protective article of claim 21, wherein the protective article comprises a surgical drape, a surgical garment, or a clean air suit.

*     *     *     *     *